Figure 1:
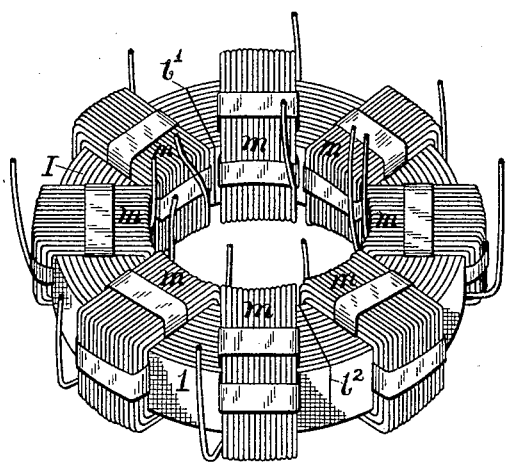

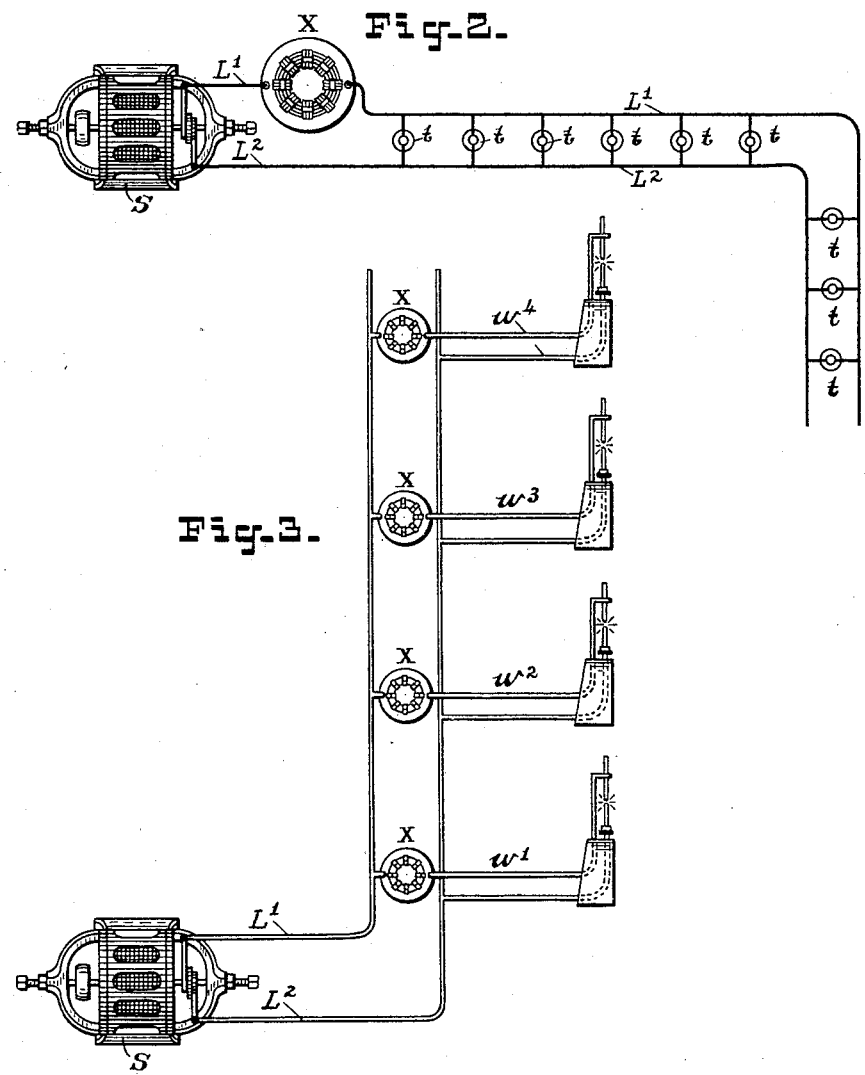

UNITED STATES PATENT OFFICE.

JOHN HOPKINSON, OF WESTMINSTER, COUNTY OF MIDDLESEX, ENGLAND, ASSIGNOR TO THE WESTINGHOUSE ELECTRIC COMPANY, OF PITTSBURG, PENNSYLVANIA.

SYSTEM OF ELECTRICAL DISTRIBUTION BY ALTERNATING CURRENTS.

SPECIFICATION forming part of Letters Patent No. 414,541, dated November 5, 1889.

Application filed January 16, 1889. Serial No. 296,564. (No model.)

*To all whom it may concern:*

Be it known that I, JOHN HOPKINSON, a subject of the Queen of Great Britain, residing in Westminster, in the county of Middlesex, England, have invented a certain new and useful Improvement in Systems of Electrical Distribution by Alternating Currents, (Case No. 262,) of which the following is a specification.

My invention involves certain improvements in the organization of those systems of electrical distribution in which translating devices are operated by alternating electric currents.

The object of the invention is to control and regulate the flow of current in the different circuits of such systems by causing the currents to themselves establish counter electro-motive force in the circuit, the value of which may vary as required, and also to provide an efficient form of apparatus for establishing or generating counter electro-motive force.

The invention therefore involves certain novel organizations of circuits and apparatus.

In carrying out the invention any suitable source of alternating electric currents is provided with a suitable system of circuits in which translating devices of any desired form may be included. Such translating devices may be connected in different branch circuits which require more or less difference of potential under the same or different circumstances. A counter-electro-motive-force generator is therefore employed in any or all of such circuits for controlling the flow of current to any given translating device or group thereof independently of the others connected in circuit. This apparatus consists, essentially, of coils of insulated wire wound upon a laminated core of soft iron closed upon itself and having its laminæ insulated from each other. The core of the counter-electro-motive-force generator may be conveniently constructed of a thin ribbon or sheet of iron formed into a ring, the laminæ of convolutions of which are separated by insulation for the purpose of preventing the formation of Foucault or "eddy" currents; or an annular sheet of iron or iron wire may be used, wound after the manner employed in the construction of the armature of the Gramme machine. This form of construction of counter-electro-motive-force generator is applicable for other uses than controlling or varying alternating currents for electric lighting. Alternating electric currents sent through more or less of the coils of such a device establish an alternating polarity in the core. The core being closed upon itself, forming a closed magnetic circuit, allows a free path for all the lines of polarization or magnetic force to flow within the coil, and the lamination and insulation prevents any material loss of energy by reason of the flow of currents in the soft-iron core. Therefore it is possible to develop by the currents traversing the coils supplied with such a core polarization approximately proportionate thereto, and by the polarization of the core to establish a counter electro-motive force approximately proportionate to the polarization or to the applied electro-motive force. By varying the number of convolutions of coil connected in circuit the number of lines of polarization established may be varied, and consequently the value of the counter electro-motive force. If the counter electro-motive force is allowed to oppose the applied difference of potential, there will be a consequent diminution of current flowing in the circuit. If more or less of the coils are closed through an independent circuit, the same principle will maintain as far as the conserving of the lines of force and the establishment of counter electro-motive force is concerned; but there will be a current established in such circuit and a consequent diminution of effective counter electro-motive force opposed to the applied difference of potential. In other words, the value of the device as a counter-electro-motive-force generator remains the same, while the precise method of utilizing the counter electro-motive force is varied.

In the accompanying drawings, Figure 1 is a perspective view of the counter-electro-motive-force generator, and Fig. 2 is a diagram illustrating an organization of circuits to which such a device is applied. Fig. 3 illustrates another organization of circuits.

Referring to the figures, $l$ represents an annular core formed by layers of soft iron separated by intervening layers I of insulating material. This core forms a closed magnetic circuit. About this core insulated coils of wire $m$ are wound. The several adjacent coils $m$ have their ends connected with contact-plates $n$, into which contact-plugs or other coupling devices may be placed for short-circuiting more or less of the coils or placing them in the circuit, as desired. Such a counter-electro-motive-force generator is shown as connected in circuit at X in Fig. 2. In this figure, S represents any suitable source of alternating electric currents. From the poles of the generator conductors $L'$ $L^2$ are derived. In one of these conductors $L'$ more or less of the coils of the device X may be connected. The length of these coils is adjustable by means of the contact-plates $n$ and the switch-plugs applied thereto. Devices $t$—such as incandescent electric lamps—are shown as connected in multiple arc between the conductors $L'$ $L^2$; but any other form of work-circuit may be substituted therefor. Any number of additional lines, as $L^3$ $L^4$, may be derived from the generator and each equipped with a counter-electro-motive-force generator X. This will serve to adjust the difference of potential upon each circuit independently of the others, as may be required.

In Fig. 3 an organization is shown in which several different circuits $w'$, $w^2$, $w^3$, and $w^4$ are derived from the lines $L'$ $L^2$, each circuit leading to a suitable translating device—such, for instance, as an arc lamp or other apparatus or system of apparatus requiring that the difference of potential applied thereto shall be controlled. Each circuit is shown as supplied with the counter-electro-motive-force generator X, which serves to regulate the difference of potential upon that circuit. When the coils of the counter-electro-motive-force generator are traversed by alternating electric currents, the core becomes alternately magnetized in opposite directions, and a counter electro-motive force is developed within the coils tending to oppose the flow of current therethrough. If the core were of solid iron, it would become heated by reason of the currents developed therein by the rapid change in polarity and would be much less efficient. By laminating the core and separating the laminations by insulation, the efficiency becomes greater. The reactive effects are increased by making the core endless or closed upon itself, for the inductive effects are increased, since there is no loss of energy by reason of lines of force escaping through the air or surrounding medium; but all the lines of force developed by current traversing the coils find a path in the core, and in turn react upon the coils, generating counter electro-motive force.

For convenience of construction the core may be first formed continuous and then cut apart, as shown at $l^2$ $l^2$, for the purpose of applying the bobbins of wire $m$, and then the ends placed against each other, substantially as before.

I claim as my invention—

1. The combination, with a source of alternating electric currents and a circuit therefor, of a generator of counter electro-motive force, consisting of a laminated core of soft iron closed upon itself, the laminations being insulated, and coils of wire wound upon said core.

2. The combination, with a source of alternating electric currents and a circuit therefor, of a counter-electro-motive-force generator consisting of a laminated core of soft iron closed upon itself, the laminations being insulated, and coils of wire wound upon said core, the length of which included in said circuit being adjustable.

3. A generator of counter electro-motive force for alternating electric currents, consisting of a closed core composed of laminæ of soft iron insulated from each other and coils of wire wound thereon.

4. A device for generating counter electro-motive force under the influence of alternating electric currents, consisting of a closed core of soft iron and coils of wire wound thereon, said core being laminated in a direction approximately parallel with the general direction of the lines of force established therein, and insulation between the laminæ.

In testimony whereof I have hereunto subscribed my name this 3d day of December, A. D. 1888.

JOHN HOPKINSON.

Witnesses:
S. B. PEECH,
S. CRANSA,
*Both of 9 Birchin Lane, London, E. C.*